United States Patent [19]

Shimamura

[11] Patent Number: 4,882,178
[45] Date of Patent: Nov. 21, 1989

[54] PROCESS FOR PREPARING YEAST RAISED DOUGHNUTS

[75] Inventor: Akira Shimamura, Kokubunji, Japan
[73] Assignee: Nisshin-DCA Foods, Inc., Tokyo, Japan
[21] Appl. No.: 198,524
[22] Filed: May 25, 1988
[30] Foreign Application Priority Data Feb. 10, 1988 [JP] Japan .................................. 58-29939

[51] Int. Cl.$^4$ .......................... A21D 2/02; A21D 8/04
[52] U.S. Cl. ..................................... 426/27; 426/439; 426/440; 426/499; 426/503; 426/504
[58] Field of Search ................. 426/27, 439, 440, 441, 426/499, 504

[56] References Cited

PUBLICATIONS

Burbidge, M. Cookery Made Simple, W. H. Allen and Co. Ltd., 1971, p. 276.

Primary Examiner—Donald E. Czaja
Assistant Examiner—Helen Pratt
Attorney, Agent, or Firm—Armstrong, Nikaido, Marmelstein, Kubovcik & Murray

[57] ABSTRACT

A process for preparing a yeast raised doughnut comprising fermenting a dough, degassing the same, cutting and forming the dough and then frying the same in oil.

1 Claim, 1 Drawing Sheet

PROCESS FOR PREPARING YEAST RAISED DOUGHNUTS

BACKGROUND OF THE INVENTION

1. Field of the Invention

The present invention relates to a process for preparing a yeast raised doughnut. More particularly, it relates to a process for preparing a yeast raised doughnut by using a pressure cutter.

2. Prior Art

A conventional process for preparing a yeast raised doughnut wherein a dough is cut and formed by using a pressure cutter is carried out in the following manner.

Namely, 45 to 55 parts by weight of water is added to 100 parts by weight of a material composition and the mixture thus obtained is kneaded in a mixer at 28° C. at a low speed for 2 minutes and then at a moderate to high speed for 8 to 10 minutes to thereby give a dough. This dough is fermented at 27° C. under a humidity of 80 % for 10 to 20 minutes. Then the fermented dough is cut and formed into rings each weighing 45 g. by using a pressure cutter under an air-pressure of 2 to 4 kg/cm$^2$. These rings are subjected to final proofing at 40° C. under a humidity of 45 % for 40 to 50 minutes, subsequently fried in oil at 185° C. for 2 minutes, i.e., one minutes per side and then cooled.

When the final proofing step in the conventional process as described above is omitted, the resulting yeast raised doughnut have a poor commercial value because of its various disadvantages such as (1) small volume; (2) high fat absorption; (3) wrinkled surface; (4) poor shape; (5) poor taste; and (6) short shelf life.

Therefore, the final proofing step is indispensable to the conventional process and thus it has been never supposed in the art to omit the same.

However, it is significantly advantageous to omit the final proofing step, which requires a specific apparatus, from the viewpoint of simplifying not only the process per se but also the equipment required therefor.

The inventor has proposed a process for preparing a yeast raised doughnut which involves no final proofing step in Japanese Patent Kokai No. 234,534/1985. Final proofing is carried out in order to inflate a dough, which has been once compressed by degassing, again. Therefore, as a matter of course, not only the final proofing step but also the degassing step is omitted in the above process. Thus a dough inflated by fermentation is gently extruded as such. That is to say, the fermented dough is immediately cut and formed with a pressure cutter and then fried in oil. However this process is disadvantageous in that the shape and grain of the obtained yeast raised doughnuts are not uniform but uneven, which makes the texture poor. In addition thereto, these yeast raised doughnuts per se do not always have satisfactory qualities. Furthermore this process considerably restricts the composition of starting materials.

Accordingly the inventor has conducted studies in order to establish a process for preparing an excellent yeast raised doughnut without effecting any final proofing. As a result, the inventor unexpectedly found that an excellent yeast raised doughnut can be prepared by daring to degass a dough which has never been subjected to any final proofing.

It has been believed in the art from a commonsense point of view that even a dough which is not degassed should be subjected to final proofing or that a dough inflated by fermentation should not be degassed but gently extruded in order to omit the final proofing step. Thus it has been beyond imagination that a dough which is compressed by degassing is subjected to no final proofing. Furthermore it is an epochmaking finding that a yeast raised doughnut superior to conventional ones in qualities can be obtained thereby.

According to the present invention, a yeast raised doughnut prepared by the process of the present invention is highly satisfactory in appearance, grain and texture, although the process of the present invention involves no final proofing step. In addition, the process of the present invention enables to always obtain uniform products.

Needless to say, it is desirable to prepare excellent products. In addition, it is significantly advantageous in mass production on an industrial scale to always obtain uniform products.

The process of the present invention further enables to select the composition of starting materials from a wide range.

SUMMARY OF THE INVENTION

The present invention provides a process for preparing a yeast raised doughnut which comprises fermenting a dough, degassing the same, cutting and forming the degassed dough with a pressure cutter and then not subjecting the dough to final proofing but immediately frying the same in oil.

DETAILED DESCRIPTION AND THE PREFERRED EMBODIMENTS OF THE INVENTION

Figure 1:
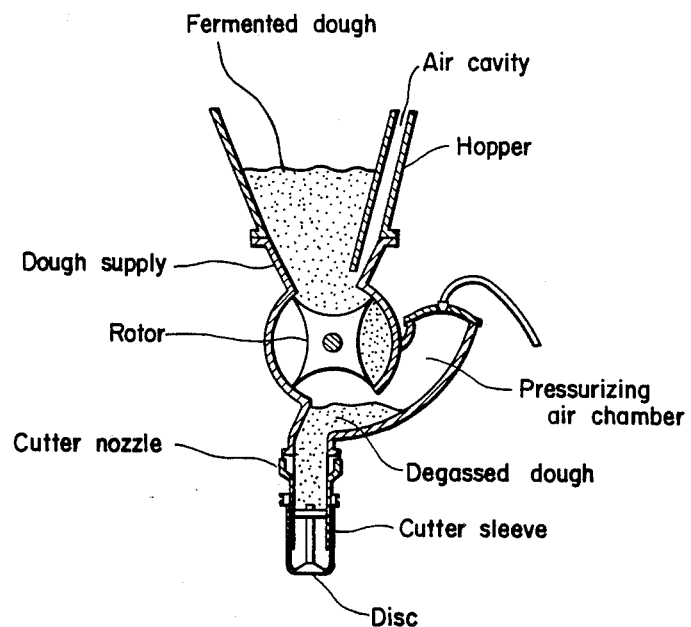
FIG. 1 is a schematic section of a rotary pressure cutter.

In the present invention, materials conventionally employed in the preparation of yeast raised doughnuts, such as wheat flour, potato powder, sugar, shortening, nonfat dry milk, egg, common salt, yeast, yeast food, a chemical leavening and a thickener may be used. As the wheat flour, a hard wheat flour or semihard wheat flour optionally blended with soft wheat flour may be employed. A mixture of hard and soft wheat flours is usually employed. The yeast food may comprise, for example, an ammonium salt such as ammonium chloride, ammonium sulfate or ammonium hydrogen phosphate; a calcium salt such as calcium carbonate, calcium sulfate or monobasic calcium phosphate; an oxidizing agent such as ascorbic acid (vitamin C); reducing agent such as glutathione or cysteine; an enzyme such as amylase or protease; an emulsifier such as a glycerol fatty acid ester or calcium stearyl lactylate; sodium chloride; and a dispersion medium such as starch or wheat flour. Examples of the chemical leavening include sodium hydrogen carbonate, monobasic calcium phosphate, calcined alum, potassium hydrogen d-tartarate, gluconolactone and a mixture thereof. Examples of the thickener include sodium alginate, sodium cellulose glycolate, casein, sodium caseinate, natural gum and a mixture thereof.

In the present invention, these materials may be blended at an appropriate ratio employed in a conventional process.

It is preferable in the present invention to add 70 to 80 parts by weight of water to 100 parts by weight of the material composition. When eggs are further used, the amount of the water to be added is adjusted by regarding the moisture content of the eggs as 75 % by weight. When the amount of the added water is lower than 70 parts by weight, the resulting dough is too hard, which makes the subsequent cutting and forming difficult. Further products having uniform shape and weight can not be obtained in this case. On the other hand, when the amount of the added water exceeds 80 parts by weight, the resulting dough is too soft. As a result, each product thus obtained has an undesirable shape, a wrinkled surface and a small volume.

Then the material composition is kneaded together with the water to thereby give a dough. This kneading is preferably carried out in a mixer at a temperature of 25 to 30° C. and at a low rotation speed for approximately 2 to 4 minutes and then at a high rotation speed for 15 to 20 minutes.

The dough thus obtained is then fermented preferably for 60 to 110 minutes. When the fermentation time is shorter than 60 minutes, the resulting dough is too hard, which makes the subsequent cutting and forming difficult. Further products having uniform shape and weight can not be obtained in this case. Each product thus obtained has a small volume, a wide spread and a wrinkled surface. On the other hand, when the fermentation time exceeds 110 minutes, the resulting dough is too soft. As a result, each product thus obtained has a poor shape, i.e., a high crown and a small ring-hole. It is preferable to effect the fermentation under conventional conditions, i.e., at 27° C. under a humidity of 80 %.

Subsequently the fermented dough is degassed. The degassing may be carried out either mechanically, i.e., continuously or batch-wise or manually. For example, mechanical degassing may be carried out by appropriately kneading the dough by using a rotary pressure cutter as shown in FIG. 1 or a mixer. The former is particularly preferable. As the rotary pressure cutter, those conventionally employed in cutting and forming cake doughnuts may be used. The fermented dough may be degassed by the rotating and pressurizing device as mentioned above and then divided and molded with the same. Thus the degassing and cutting/forming steps of the process of the present invention can be successively carried out by using this device. Therefore the continuous production of yeast raised doughnuts can be achieved thereby. In addition, both of cake doughnuts and yeast raised doughnuts can be prepared by a single equipment, which is highly advantageous from an industrial viewpoint.

Subsequently the dough degassed by the abovementioned process is cut and formed. This step may be preferably carried out under an air-pressure of 0.1 to 0.3 kg/cm². When the air-pressure is lower than the range as determined above, the dough can not be sufficiently extruded. On the other hand, when the air-pressure exceeds the above range, the dough would be extruded at an excessively high rate. Thus the resulting product has an excessively high volume, a wrinkled surface and an undesirable shape. It is preferable to cut and form the dough in such a manner as to give rings each weighing approximately 40 to 60 g, similar to a conventional case.

The dough thus cut and formed is not subjected to final proofing but immediately fried in oil. The frying is preferably carried out in a conventional manner, for example, at an oil temperature of approximately 180 to 185° C. for approximately 2 to 4 minutes, i.e., approximately 1 to 2 minutes per side. After completion of the frying, the products are cooled in a conventional manner.

Effects of the Invention

According to the present invention, a process for preparing a yeast raised doughnut can be simplified by omitting a final proofing step, which has been believed impossible in the art. As a result, it requires no final proofing apparatus, which saves both energy and investment.

The yeast raised doughnut prepared by the process of the present invention has a scarcely wrinkled surface and an excellent shape. It has a spread/crown ratio of 2 to 3 and a specific volume of 3 to 4, each of which falls within a standard range generally employed as a guidance of a proper shape.

To further illustrate the present invention, the following Examples and Comparative Examples will be given.

EXAMPLE 1

(1) Material Composition

| wheat flour | 100 (parts by weight) |
|---|---|
| sugar | 15 (parts by weight) |
| shortening | 11 (parts by weight) |
| common salt | 1.5 (parts by weight) |
| nonfat dry milk | 2 (parts by weight) |
| defatted soy flour | 4.5 (parts by weight) |
| chemical leavening* | 2 (parts by weight) |
| dried whole egg powder | 2 (parts by weight) |
| emulsifier | 1 (parts by weight) |
| vegetable protein | 3 (parts by weight) |
| vitamin C | 40 (ppm) |
| potassium hydrogen d-tartarate | 40 (ppm) |
| *Composition of chemical leavening | |
| sodium hydrogen carbonate | 45 (% by weight) |
| sodium acid pyrophosphate | 55 (% by weight) |

These materials were homogeneously blended together to give a mix. To 100 parts by weight of this mix, 45 parts by weight of water, 30 parts by weight of fresh eggs (moisture content of 75 %) and 3 parts by weight of lemon juice, i.e., 70.5 parts by weight of moisture in total, and 5 parts by weight of yeast were added. Then yeast raised doughnuts were prepared in the following manner.

(2) Preparation (i) Kneading

The above mixture was kneaded in a mixer (CS Type 20E: manufacture by Kanto Kongoki K. K.) at a low speed (40 rpm) for 2 minutes and then at a high speed (80 rpm) for additional 18 minutes at 27° C. to thereby give a dough.

(ii) Fermentation

The dough was fermented at 27° C. under a humidity of 80 % for 60 minutes.

(iii) Degassing and cutting/forming

The fermented dough was degassed, cut and formed into doughnut rings each weighing approximately 50 g. by using a rotary pressure cutter (EC-2: mfd. by DCA Co., U.S.A.) under an air-pressure of 0.1 to 0.2 kg/cm².

(iv) Frying

The doughnut rings were immediately fried in oil at 180° C. for 75 sec. per side, i.e., 150 sec. in total.

(v) Cooling

After the completion of the frying, the products were allowed to cool to thereby give the aimed yeast raised doughnuts.

EXAMPLE 2

The procedure of Example 1 was followed except that the fermented dough was degassed by stirring the same in the same mixer as the one used in Example 1 at a moderate speed (60 rpm) for 2 minutes and then the degassed dough was cut and formed by using a dough can type pressure cutter under an air-pressure of 0.1 to 0.2 kg/cm$^2$ to thereby give yeast raised doughnuts.

EXAMPLE 3

Material Composition

| | |
|---|---|
| wheat flour | 100 (parts by weight) |
| sugar | 8 (parts by weight) |
| shortening | 10 (parts by weight) |
| common salt | 1.5 (parts by weight) |
| nonfat dry milk | 3 (parts by weight) |
| defatted soy flour | 3 (parts by weight) |
| yeast food* | 0.2 (parts by weight) |
| potato powder | 3 (parts by weight) |
| chemical leavening** | 1 (parts by weight) |
| dried whole egg powder | 5 (parts by weight) |
| sodium caseinate | 0.1 (parts by weight) |
| *Composition of yeast food | |
| calcium sulfate | 36 (% by weight) |
| ammonium chloride | 12 (% by weight) |
| salt | 31 (% by weight) |
| starch | 21 (% by weight) |
| **Composition of chemical leavening: | |
| sodium hydrogen carbonate | 37 (% by weight) |
| potassium hydrogen d-tartarate | 18 (% by weight) |
| calcined alum | 40 (% by weight) |
| starch | 5 (% by weight) |

These materials were homogeneously blended together to give a mix.

To 100 parts by weight of this mix, 55 parts by weight of water, 30 parts by weight of fresh eggs (moisture content of 75 %) and 6 parts by weight of yeast were added. Then yeast raised doughnuts were prepared from the resulting mixture in the same manner as the one described in Example 1 except that the kneading was carried out at a low speed for 2 minutes and then at a high speed for 20 minutes.

COMPARATIVE EXAMPLE 1

The procedure of Example 1 was followed except that the fermented dough was not degassed but immediately cut and formed by using a dough can type pressure cutter under an air-pressure of 0.2 to 0.3 kg/cm$^2$.

COMPARATIVE EXAMPLE 2

The procedure of Example 3 was followed except that the fermented dough was not degassed but immediately cut and formed by using a dough can type pressure cutter under an air-pressure of 0.2 to 0.3 kg/cm$^2$.

Table 1 shows the physical data and evaluation of the yeast raised doughnuts as prepared in Examples 1 to 3 and

COMPARATIVE EXAMPLES 1 and 2.

The physical data of each yeast raised doughnut was determined by measuring the corresponding values of four products. Each yeast raised doughnut was evaluated by ten panelists according to the following criterion and expressed on the average.

Criterion for evaluation

Appearance:
4: Bulky. Highly tensional, glossy and unwrinkled surface.
3: Somewhat bulky. Somewhat tensional and slightly wrinkled surface.
2: Somewhat less bulky. Tensionless and somewhat wrinkled surface.
1: Less bulky. Tensionless and highly wrinkled surface.
Grain:
4: Thin cell walls and open grain.
3: Somewhat thin cell walls and somewhat coarse grain.
2: Somewhat thick cell walls and somewhat dense grain.
1: Thick film and dense grain.
Texture:
4: Tender, crisp and good go away in mouth.
3: Tender, somewhat crisp and somewhat go away in mouth.
2: Somewhat tender, somewhat less crisp and somewhat less go away in mouth.
1: Tough, not crisp and less go away in mouth.

TABLE 1

| | Ex. 1 | Ex. 2 | Ex. 3 | C.1 | C.2 |
|---|---|---|---|---|---|
| Physical data | | | | | |
| specific volume | 3.3 | 3.7 | 3.1 | 4.2 | 3.5 |
| spread (mm) | 330 | 350 | 370 | 320 | 320 |
| crown (mm) | 140 | 145 | 145 | 150 | 145 |
| spread/crown | 2.4 | 2.4 | 2.6 | 2.1 | 2.2 |
| Evaluation | | | | | |
| appearance | 4 | 3.5 | 3.5 | 2 | 1.5 |
| grain | 4 | 3 | 2.5 | 3 | 2 |
| texture | 4 | 3.5 | 3.5 | 3 | 2.5 |
| total | 12 | 10 | 9.5 | 8 | 6 |

What is claimed is:

1. A process for preparing a yeast raised doughnut, comprising the steps of fermenting a doughnut dough containing yeast and a chemical leavening agent for a fermentation time in the range of 60–110 minutes, degassing the fermented dough, cutting and forming the degassed dough with a pressure cutter, and then not subjecting the cut dough to final proofing but immediately frying the cut dough in oil to obtain a yeast raised doughnut.

* * * * *